(12) United States Patent
Wujcik et al.

(10) Patent No.: US 10,329,398 B2
(45) Date of Patent: Jun. 25, 2019

(54) METHOD OF PRODUCING A FLEXIBLE POLYURETHANE FOAM ARTICLE

(71) Applicant: BASF SE, Ludwigshafen (DE)

(72) Inventors: Steven E. Wujcik, Ann Arbor, MI (US); Rajesh Kumar, Riverview, MI (US); Christopher J. Milantoni, Woodhaven, MI (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 13/785,784

(22) Filed: Mar. 5, 2013

(65) Prior Publication Data

US 2013/0237622 A1 Sep. 12, 2013

Related U.S. Application Data

(60) Provisional application No. 61/607,391, filed on Mar. 6, 2012, provisional application No. 61/675,091, filed on Jul. 24, 2012.

(51) Int. Cl.

| | |
|---|---|
| *C08G 18/09* | (2006.01) |
| *C08G 18/16* | (2006.01) |
| *C08G 18/40* | (2006.01) |
| *C08G 18/48* | (2006.01) |
| *C08G 18/63* | (2006.01) |
| *C08G 18/66* | (2006.01) |
| *C08G 18/76* | (2006.01) |
| *C08J 9/00* | (2006.01) |
| *C08J 9/02* | (2006.01) |
| *C08J 9/12* | (2006.01) |
| *C08L 71/02* | (2006.01) |
| *C08L 75/08* | (2006.01) |
| *C08G 101/00* | (2006.01) |

(52) U.S. Cl.
CPC ............ *C08J 9/125* (2013.01); *C08G 18/095* (2013.01); *C08G 18/168* (2013.01); *C08G 18/4072* (2013.01); *C08G 18/4841* (2013.01); *C08G 18/632* (2013.01); *C08G 18/6688* (2013.01); *C08G 18/7621* (2013.01); *C08J 9/0023* (2013.01); *C08J 9/0038* (2013.01); *C08J 9/02* (2013.01); *C08L 71/02* (2013.01); *C08L 75/08* (2013.01); C08G 2101/005 (2013.01); C08G 2101/0008 (2013.01); C08G 2101/0083 (2013.01); C08G 2105/06 (2013.01); C08G 2261/128 (2013.01); C08G 2350/00 (2013.01); C08J 2201/022 (2013.01); C08J 2205/05 (2013.01); C08J 2205/06 (2013.01); C08J 2375/08 (2013.01); C08L 2205/05 (2013.01)

(58) Field of Classification Search
CPC ..................................................... C08J 9/0038
USPC ................................................. 521/106, 107
See application file for complete search history.

(56) References Cited

U.S. PATENT DOCUMENTS

| | | |
|---|---|---|
| 3,767,708 A | 10/1973 | Smith et al. |
| 4,166,164 A | 8/1979 | Cenker et al. |
| 4,234,694 A | 11/1980 | La Spina et al. |
| 4,284,730 A | 8/1981 | Narayan et al. |
| 4,424,288 A | 1/1984 | Patton, Jr. et al. |
| 4,743,626 A | 5/1988 | Narayan |
| 5,089,534 A * | 2/1992 | Thoen et al. ................ 521/106 |
| 5,214,076 A | 5/1993 | Tideswell et al. |
| 5,234,960 A | 8/1993 | Leenslag |
| 5,494,942 A * | 2/1996 | Ottens et al. ................ 521/159 |
| 5,504,241 A * | 4/1996 | Pohl et al. ...................... 560/25 |
| 5,621,051 A | 4/1997 | Okutani et al. |
| 5,627,220 A | 5/1997 | Matsumoto et al. |
| 5,645,928 A * | 7/1997 | Matsumoto et al. ...... 428/304.4 |
| 5,730,909 A * | 3/1998 | Smiecinski et al. .......... 252/609 |
| 5,830,926 A * | 11/1998 | Smiecinski et al. .......... 521/128 |
| 6,043,292 A * | 3/2000 | Huygens et al. ............. 521/133 |
| 6,288,134 B1 | 9/2001 | Leenslag |
| 6,306,956 B1 * | 10/2001 | Spilman .................... C08J 3/02 524/507 |
| 6,765,034 B2 | 7/2004 | Nishida et al. |
| 6,765,035 B2 * | 7/2004 | Eling et al. ................... 521/174 |
| 7,112,631 B2 | 9/2006 | Zhang et al. |
| 7,214,739 B2 | 5/2007 | Kannan et al. |

(Continued)

FOREIGN PATENT DOCUMENTS

| | | |
|---|---|---|
| EP | 0553710 A2 * | 8/1993 |
| GB | 1499447 A | 2/1978 |

OTHER PUBLICATIONS

Univesity of Cambridge, Open Parser for Systematic IUPAC nomenclature (OPSIN), "1-phenyl-3-methyl-1-oxo-2-phospholene"; "1-phenyl-3-methyl-1-oxo-3 phospholene"; and "1-ethyl-1-oxophospholene", accessed Dec. 2017.*

Matsumoto et al., All CO2 Blown Carbodiimide-modified Polyisocyanurate Foam for Metal-faced Sandwich Panel, Polyurethane, pp. 175-181, Sep. 1995.

Saiki et al., Carbodiimide-Modified Polyisocyanurate Foams: Preparation and Flame Resistance, Journal of Cellular Plastics, vol. 30, pp. 470-484, Sep. 1994.

(Continued)

*Primary Examiner* — Melissa A Rioja
(74) *Attorney, Agent, or Firm* — DLA Piper LLP (US)

(57) ABSTRACT

A flexible polyurethane foam article exhibiting flame resistance comprises the reaction product of an isocyanate and an isocyanate-reactive component comprising a polyol reactive with the isocyanate. The isocyanate and the isocyanate-reactive component are reacted in the presence of a blowing agent and a phospholene oxide. A method of producing the flexible polyurethane foam article includes the step of reacting the isocyanate and the isocyanate-reactive component in the presence of the blowing agent and an effective amount of the phospholene oxide to form the flexible polyurethane foam article which is flame resistant.

19 Claims, No Drawings

(56) References Cited

U.S. PATENT DOCUMENTS

| | | | |
|---|---|---|---|
| 2006/0211784 A1* | 9/2006 | Veneruso | C08G 18/7664 |
| | | | 521/99 |
| 2009/0131591 A1 | 5/2009 | Schindler et al. | |
| 2009/0227695 A1* | 9/2009 | Burdeniuc et al. | 521/113 |
| 2010/0160470 A1* | 6/2010 | Smiecinski et al. | 521/137 |
| 2011/0257284 A1* | 10/2011 | Bruchmann et al. | 521/137 |

OTHER PUBLICATIONS

International Search Report for Application No. PCT/US2013/029090 dated May 17, 2013, 3 pages.

Moedritzer, Kurt and Miller, Raymond E.(1978) 'Improved Syntheses and Characterization of the Isomers of 3-Methyl-1-Phenylphosphoiene 1-Oxide', Synthesis and Reactivity in Inorganic, Metal-Organic, and Nano-Metal Chemistry, 8: 2, 167-184; Taylor and Francis, Mortimer House, 37-41 Mortimer Street, London.

* cited by examiner

METHOD OF PRODUCING A FLEXIBLE POLYURETHANE FOAM ARTICLE

CROSS REFERENCE TO RELATED APPLICATIONS

This application claims the benefit of and priority to U.S. Provisional Patent Application Nos. 61/607,391, filed on Mar. 6, 2012 and 61/675,091, filed on Jul. 24, 2012, which are incorporated herewith by reference in its entirety.

FIELD OF THE DISCLOSURE

The instant disclosure generally relates to method of producing a flexible polyurethane foam article and to the flexible polyurethane foam article which is flame resistant.

BACKGROUND OF THE DISCLOSURE

Polyurethane foams exhibit a wide range of stiffness, hardness, and density. One type of polyurethane foam, flexible polyurethane foam, is especially useful for providing cushioning, support, and comfort for furniture articles. For example, flexible polyurethane foam is often incorporated into furniture comfort articles, such as cushions, padding, mattresses, topper pads, and pillows, as well as furniture support articles, such as sofas, love seats, and chairs.

Flexible polyurethane foams are typically flammable, especially when subjected to repeated compression and bending, but can be formulated to resist small open flame ignition sources. The repeated compression and bending often compromises the cellular structure of flexible polyurethane foams. This phenomenon is generally referred to as flex fatigue. Since flexible polyurethane foams are repeatedly subjected to compression and bending and thus, over time, experience flex fatigue when used in furniture comfort and support articles, United States federal and state regulations currently proscribe flammability limits for flexible polyurethane foams. One such federal regulation, 49 C.F.R. § 571.302-Standard No. 302, specifies requirements, test procedures, and equipment for testing the flammability of interior materials, e.g. flexible polyurethane foams, in vehicles such as passenger cars, multipurpose passenger vehicles, trucks, and buses. One such state regulation, State of California Technical Bulletin 117, specifies requirements, test procedures, and equipment for testing flame retardance of resilient filling materials, e.g. flexible polyurethane foams, in upholstered furniture.

Various approaches for producing flexible polyurethane foams exhibiting flame retardance and flexibility are known in the art. Many existing flexible polyurethane foams exhibiting flame retardance rely on inclusion of conventional flame retardant additives. For example, flame retardant additives including minerals, such as aluminum trihydrate; salts, such as hydroxymethyl phosphonium salts; phosphorous compounds; phosphated esters; and halocarbons or other halogenated compounds, such as those including bromine and/or chlorine; may be included. However, there are disadvantages associated with inclusion of conventional flame retardant additives flexible polyurethane foams. More specifically, conventional flame retardant additives are expensive, can complicate the production/formation of flexible polyurethane foams, and can negatively impact the physical properties of flexible polyurethane foams formed therewith.

SUMMARY OF THE DISCLOSURE AND ADVANTAGES

The instant disclosure provides a method of producing a flexible polyurethane foam article which is flame resistant. The method includes the step of reacting an isocyanate and an isocyanate-reactive component, comprising a polyol reactive with the isocyanate, in the presence of the blowing agent and an effective amount of a phospholene oxide to form the flexible polyurethane foam article.

The instant disclosure also provides the flexible polyurethane foam article which exhibits flame resistance. The flexible polyurethane foam article comprises the reaction product of the isocyanate and the isocyanate-reactive component which are reacted in the presence of the blowing agent and the phospholene oxide. The flexible polyurethane foam article meets at least one of the following two requirements for flame resistance:

(1) the flexible polyurethane foam article has an average burn resistance of less than 4 inches per minute when measured according to 49 C.F.R. § 571.302, Standard No. 302; and (2) the flexible polyurethane foam article has an average char length of less than or equal to 6 inches, and
a maximum char length of less than or equal to 8 inches, and
an average afterflame of less than or equal to 5 seconds, and
a maximum afterflame of less than or equal to 10 seconds, and
an average afterglow of less than or equal to 15 seconds,
in each case, before and after aging for 24 hours at 220° F. (104° C.) when measured according to State of California Technical Bulletin 117, Section A, Part 1.

The flexible polyurethane foam article of the instant disclosure exhibits excellent flame resistance and reduced material and processing costs associated with the production. Further, the flexible polyurethane foam article of the instant disclosure exhibits excellent comfort and support properties.

DETAILED DESCRIPTION OF THE DISCLOSURE

The instant disclosure includes a method of producing a flexible polyurethane foam article which is flame resistant and the flexible polyurethane foam article which is flame resistant. The flexible polyurethane foam article comprises the reaction product of an isocyanate and an isocyanate-reactive component in the presence of a blowing agent and a phospholene oxide. The flexible polyurethane foam article is particularly suitable for providing cushioning, support, and comfort in furniture articles, such as cushions, padding, and mattresses. However, it is to be appreciated that the flexible polyurethane foam article of the instant disclosure can have applications beyond furniture articles, such as noise, vibration, and harshness (NVH) reduction articles for vehicles.

The instant disclosure describes a polyurethane system comprising the isocyanate and the isocyanate-reactive component. Typically, the system is provided in two or more discrete components, such as the isocyanate and the isocyanate-reactive (or resin) component, i.e., as a two-component (or 2K) system, which is described further below. It is to be appreciated that reference to the isocyanate and resin component, as used herein, is merely for purposes of establishing a point of reference for placement of the individual components of the system, and for establishing a parts by weight basis. As such, it should not be construed as limiting the present invention to only a 2K system. For example, the individual components of the system can all be kept distinct from each other.

As used herein, the terminology "flexible polyurethane foam" denotes a particular class of polyurethane foam and stands in contrast to rigid polyurethane foam. Flexible polyurethane foam is generally porous, having open cells, whereas rigid polyurethane foam is generally non-porous, having closed cells and no rubber-like characteristics. In particular, flexible polyurethane foam is a flexible cellular product which will not rupture when a specimen 200 mm by 25 mm by 25 mm is bent around a 25-mm diameter mandrel at a uniform rate of 1 lap in 5 seconds at a temperature between 18 and 29° C., as defined by ASTM D3574-03.

Further, polyol selection impacts the stiffness of flexible polyurethane foams. Flexible polyurethane foams are typically produced from polyols having weight average molecular weights from about 1,000 to about 10,000 g/mol and hydroxyl numbers from about 10 to about 200 mg KOH/g. In contrast, rigid polyurethane foams are typically produced from polyols having weight average molecular weights from about 250 to about 700 g/mol and hydroxyl numbers from about 300 to about 700 mg KOH/g. Moreover, flexible polyurethane foams generally include more urethane linkages as compared to rigid polyurethane foams, whereas rigid polyurethane foams may include more isocyanurate linkages as compared to flexible polyurethane foams. Further, flexible polyurethane foams are typically produced from low-functionality (f) initiators, i.e., f<4, such as dipropylene glycol (f=2) or glycerine (f=3). By comparison, rigid polyurethane foams are typically produced from polyols having high-functionality initiators, i.e., f≥4, such as Mannich bases (f=4), toluenediamine (f=4), sorbitol (f=6), or sucrose (f=8). Additionally, as known in the art, flexible polyurethane foams are typically produced from glycerine-based polyether polyols, whereas rigid polyurethane foams are typically produced from polyfunctional polyols that create a three-dimensional cross-linked cellular structure, thereby increasing the stiffness of the rigid polyurethane foam. Finally, although both flexible polyurethane foams and rigid polyurethane foams include cellular structures, flexible polyurethane foams typically include more open cell walls, which allow air to pass through the flexible polyurethane foam when force is applied as compared to rigid polyurethane foams. As such, flexible polyurethane foams typically recover shape after compression. In contrast, rigid polyurethane foams typically include more closed cell walls, which restrict air flow through the rigid polyurethane foam when force is applied. Therefore, flexible polyurethane foams are typically useful for cushioning and support applications, e.g. furniture comfort and support articles, whereas rigid polyurethane foams are typically useful for applications requiring thermal insulation, e.g. appliances and building panels.

As described above, the flexible polyurethane foam article of the instant disclosure comprises the reaction product of the isocyanate and the isocyanate-reactive component. It is to be appreciated that one or more isocyanates can be reacted with the isocyanate-reactive component to form the flexible polyurethane foam article. It is also to be appreciated that the isocyanate is not limited to any particular genus of isocyanate, e.g. the isocyanate can include monomeric isocyanate, polymeric isocyanate, and mixtures thereof. In addition, the isocyanate can include prepolymers, e.g. polyols reacted with excess isocyanate. Typically, the isocyanate comprises toluene diisocyanate (TDI), such as 2,4'-TDI and 2,6'-TDI.

As described above, the flexible polyurethane foam article of the instant disclosure comprises the reaction product of the isocyanate and the isocyanate-reactive component. The isocyanate-reactive component comprises a polyol, which is reactive with the isocyanate. It is to be appreciated that the isocyanate-reactive component can include one or more polyols. Typically, the isocyanate-reactive component includes a combination of polyols. The polyol includes one or more OH functional groups, typically at least two OH functional groups. The polyol typically includes a conventional polyol, such as polyether polyol and/or polyester polyol. Other suitable polyols include, but are not limited to, biopolyols, such as soybean oil, castor-oil, soy-protein, rapeseed oil, etc., and combinations thereof.

In one embodiment, the isocyanate-reactive component comprises a polyether polyol. Suitable polyether polyols, for purposes of the present invention include, but are not limited to, products obtained by the polymerization of a cyclic oxide, for example ethylene oxide (EO), propylene oxide (PO), butylene oxide (BO), or tetrahydrofuran in the presence of polyfunctional initiators. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable polyether polyols include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Copolymers having oxyethylene contents of from about 5 to about 90% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofuran.

In one embodiment, the polyether polyol is a polyether triol. In this embodiment, the polyether triol has a hydroxyl number of from 20 to 90, more typically from 40 to 70, and most typically 50 to 60, mg KOH/g. Further, the polyether triol of this embodiment typically has a weight average molecular weight of from 1,000 to 10,000, more typically from 2,000 to 6,000, and most typically from 2,500 to 3,500, g/mol. In this embodiment, the polyether polyol is typically present in the isocyanate-reactive component in an amount of greater than 10, more typically greater than 50, still more typically from 75 to 100, and most typically from 85 to 100, parts by weight, based on 100 parts by weight of total polyol present in the isocyanate-reactive component.

In another embodiment, the isocyanate-reactive component comprises a graft polyol. The graft polyol is dispersed polymer solids chemically grafted to a carrier polyol. More specifically, the graft polyol of the isocyanate-reactive component comprises the carrier polyol and particles of co-polymerized styrene and acrylonitrile, wherein the particles of co-polymerized styrene and acrylonitrile are dispersed in the carrier polyol, as set forth in more detail below. The graft polyol typically has a nominal functionality of from 2 to 4, more typically from 2.5 to 3.5 and typically has a hydroxyl number of from 10 to 100, more typically from 15 to 50, and most typically 20 to 35, mg KOH/g.

Typically, the carrier polyol of the graft polyol is a polyether polyol. The carrier polyol may be any known polyether polyol in the art and preferably serves as a continuous phase for the dispersed co-polymerized styrene and acrylonitrile particles. That is, the co-polymerized styrene and acrylonitrile particles are dispersed in the carrier polyol to form a dispersion, i.e., to form the graft polyol. The particles of co-polymerized styrene and acrylonitrile are typically dispersed in the carrier polyol in an amount of from 10 to 70, more typically from 15 to 60, and most typically from 20 to 55, parts by weight, based on 100 parts by weight of the graft polyol.

If present, the graft polyol is typically present in the isocyanate-reactive component in an amount of from 5 to 100, more typically from 10 to 90, and most typically from 15 to 80, parts by weight, based on 100 parts by weight of total polyol present in the isocyanate-reactive component.

In yet another embodiment, the isocyanate-reactive component comprises a graft polyol and a polyether polyol having a functionality of greater than 2 and a hydroxyl number of from 15 to 100, more typically from 20 to 50, and most typically 25 to 35, mg KOH/g. One non-limiting example of the polyether polyol of this embodiment is a primary hydroxyl terminated polyether triol. If present, the polyether polyol is typically present in the isocyanate-reactive component in an amount of from 5 to 100, more typically from 10 to 75, and most typically from 15 to 45, parts by weight based on 100 parts by weight of total polyol present in the isocyanate-reactive component. If the graft polyol and the polyether polyol are both present in the isocyanate-reactive component, they are typically present in a ratio of from 1:2 to 6:1, more typically from 1:1 to 5:1, and most typically from 2:1 to 4:1.

The isocyanate-reactive component typically comprises one or more cross-linking agents. When utilized in the isocyanate-reactive component, the cross-linking agent generally allows phase separation between copolymer segments of the flexible polyurethane foam. That is, the flexible polyurethane foam typically comprises both rigid urea copolymer segments and soft polyol copolymer segments. The cross-linking agent typically chemically and physically links the rigid urea copolymer segments to the soft polyol copolymer segments. Therefore, the cross-linking agent is typically present in the isocyanate-reactive component to modify the hardness, increase stability, and reduce shrinkage of the flexible polyurethane foam. One non-limiting example of a suitable cross-linking agent is diethanolamine.

The isocyanate-reactive component also typically comprises one or more catalysts. The catalyst is typically present in the isocyanate-reactive component to catalyze the reaction between the isocyanate and the polyol. It is to be appreciated that the catalyst is typically not consumed in the exothermic reaction between the isocyanate and the polyol. More specifically, the catalyst typically participates in, but is not consumed in, the exothermic reaction. The catalyst may include any suitable catalyst or mixtures of catalysts known in the art. Examples of suitable catalysts include, but are not limited to, gelation catalysts, e.g. amine catalysts in dipropylene glycol; blowing catalysts, e.g. bis(dimethylaminoethyl)ether in dipropylene glycol; and metal catalysts, e.g. tin, bismuth, lead, etc.

The isocyanate-reactive component also typically comprises one or more surfactants. The surfactant typically supports homogenization of the blowing agent and the polyol and regulates a cell structure of the polyurethane foam. The surfactant may include any suitable surfactant or mixtures of surfactants known in the art. Non-limiting examples of suitable surfactants include various silicone surfactants, salts of sulfonic acids, e.g. alkali metal and/or ammonium salts of oleic acid, stearic acid, dodecylbenzene- or dinaphthylmethane-disulfonic acid, and ricinoleic acid, foam stabilizers such as siloxaneoxyalkylene copolymers and other organopolysiloxanes, oxyethylated alkyl-phenols, oxyethylated fatty alcohols, paraffin oils, castor oil, castor oil esters, and ricinoleic acid esters, and cell regulators, such as paraffins, fatty alcohols, and dimethylpolysiloxanes. One specific, non-limiting example of a surfactant is a silicone glycol copolymer.

The isocyanate-reactive component may optionally include one or more additives. Suitable additives for purposes of the instant disclosure include, but are not limited to, chain-extenders, chain-terminators, processing additives, adhesion promoters, anti-oxidants, defoamers, anti-foaming agents, water scavengers, molecular sieves, fumed silicas, ultraviolet light stabilizers, fillers, thixotropic agents, silicones, colorants, inert diluents, and combinations thereof. If included, the additive can be included in the isocyanate-reactive component in various amounts.

The isocyanate and the isocyanate-reactive component are reacted in the presence of a blowing agent to form the flexible polyurethane foam. The blowing agent may be a physical blowing agent, a chemical blowing agent, or a combination of a physical blowing agent and chemical blowing agent.

The terminology physical blowing agent refers to blowing agents that do not chemically react with the isocyanate and/or the isocyanate-reactive component. The physical blowing agent can be a gas or liquid. The liquid physical blowing agent typically evaporates into a gas when heated, and typically returns to a liquid when cooled.

The terminology chemical blowing agent refers to blowing agents which chemically react with the isocyanate or with other components to release a gas for foaming. One specific, non-limiting example of a chemical blowing agent is water.

The blowing agent is typically present in the isocyanate-reactive component in an amount of from about 0.5 to about 20 parts by weight, based on 100 parts by weight of total polyol present in the isocyanate-reactive component.

Referring back, the flexible polyurethane foam article comprises the reaction product of the isocyanate and the isocyanate-reactive component in the presence of a blowing agent and a phospholene oxide. It is to be appreciated that the isocyanate and the isocyanate-reactive component can be reacted in the presence of a blowing agent and one or more phospholene oxides to form the flexible polyurethane foam article. Suitable, non limiting examples of phospholene oxides include phospholene oxides such as 3-methyl-1-phenyl-2-phospholene oxide (MPPO), 1-phenyl-2-phospholen-1-oxide, 3-methyl-1-2-phospholen-1-oxide, 1-ethyl-2-phospholen-1-oxide, 3-methyl-1-phenyl-2-phospholen-1-oxide, 3-phospholene isomers thereof, and 3-methyl-1-ethyl-2-phospholene oxide (MEPO).

One particularly suitable phospholene oxide is MPPO, represented by the following structure:

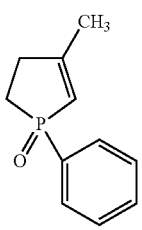

Another particularly suitable phospholene oxide is MEPO, represented by the following structure:

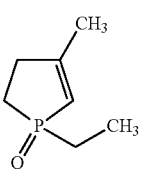

While the isocyanate-reactive component and the isocyanate chemically react to form polyurethane, the phospholene oxide also catalyzes a chemical reaction between isocyanates present in the isocyanate to form carbodiimide moieties. As such, the polyurethane of the flexible polyurethane foam article of the instant disclosure has carbodiimide functionality. Without being bound by theory, it is believed that the carbodiimide functionality of the polyurethane of the flexible polyurethane foam article imparts excellent flame resistance on the flexible polyurethane foam article because of the thermal stability of the carbodiimide functional groups. Notably, the phospholene oxide does not negatively impact the physical properties of the flexible polyurethane foam article. Once the flexible polyurethane foam article of the instant disclosure is formed and exposed to excess heat or flame, it is further believed that the phospholene oxide within the flexible polyurethane foam article further catalyzes additional chemical reactions which also decrease the flammability of the polyurethane foam article. As such, the phospholene oxide facilitates the formation of a polyurethane having carbodiimide functionality which exhibits excellent flame resistance, and forms a flexible polyurethane foam article which exhibits in situ flame resistance and excellent physical properties.

Surprisingly, the use of relatively small amount of the phospholene oxide during the formation of the polyurethane foam article is an effective amount for improving the flame resistance of the flexible polyurethane foam article. Accordingly, the phospholene oxide is typically present in the isocyanate-reactive component in an amount of from 0.05 to 6.0, more typically of from 0.07 to 2.0, and most typically of from 0.09 to 1.2, percent by weight based on 100 percent by weight of the isocyanate-reactive component. Alternatively, the phospholene oxide is typically present in the isocyanate-reactive component in an amount of from 0.05 to 6.0, more typically of from 0.07 to 2.0, and most typically of from 0.09 to 1.2, parts by weight, based on 100 parts by weight of total polyol present in the isocyanate-reactive component.

The isocyanate-reactive component may also comprise one or more solvents. The solvent may be any solvent known in the art. Typically, the solvent is mixed with the phospholene oxide to form a mixture. If mixed with the phospholene oxide to form the mixture, the solvent is typically included in the mixture in an amount of up to 90, more typically from 25 to 80, and most typically from about 40 to about 70, parts by weight, based on 100 parts by weight of the mixture. If included, the mixture is typically present in the isocyanate-reactive component in an amount of from 0.05 to 6.0, more typically of from 0.07 to 3.2, and most typically of from 0.3 to 1.6, percent by weight based on 100 percent by weight of the isocyanate-reactive component. Alternatively, the mixture is typically present in the isocyanate-reactive component in an amount of from 0.05 to 6.0, more typically of from 0.07 to 3.2, and most typically of from 0.3 to 1.6, parts by weight, based on 100 parts by weight of total polyol present in the isocyanate-reactive component.

In one embodiment, the solvent is an alkyl phosphate. Without being bound by theory, it is believed that the alkyl phosphate, in combination with the phospholene oxide, helps catalyze a chemical reaction between the isocyanates of the isocyanate to form carbodiimide, i.e., to form a polyurethane having carbodiimide functionality and excellent flame resistance. Said differently, it is believed that the alkyl phosphate, when used in combination with the phospholene oxide to form the polyurethane foam article provides a synergistic effect on the flame resistance of the polyurethane foam article. One suitable, non-limiting example of an alkyl phosphate is triethyl phosphate (TEP), which is represented by the following structure:

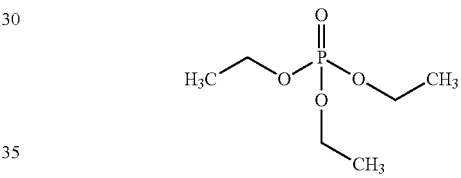

In one particular embodiment, 3-methyl-1-phenyl-2-phospholene oxide and TEP are present in a weight ratio of from 1:10 to 10:1, more typically from 1:5 to 3:1, and most typically from 1:3 to 1:1.

In one embodiment, the isocyanate and the isocyanate-reactive component are substantially free of conventional flame retardant additives. As such, the flexible polyurethane foam of this embodiment is substantially free of conventional flame retardant additives. "Substantially free" as used herein in relation to the flexible polyurethane foam being substantially free of conventional flame retardant additives means that the flexible polyurethane foam typically comprises conventional flame retardant additives in an amount less than about 5.0, more typically less than about 1.0, even more typically less than about 0.5, even more typically 0, parts by weight based on 100 parts by weight of all components used to produce the flexible polyurethane foam. As set forth above, examples of conventional flame retardant additives include minerals, such as aluminum trihydrate; salts, such as hydroxymethyl phosphonium salts; phosphorus-containing compounds; halogenated flame retardant additives, such as halocarbons; and melamine, which is also utilized as a flame retardant additive in particular applications. Unexpectedly, even without inclusion of conventional flame retardant additives, the flexible polyurethane foam typically meets the flame resistance requirements set forth in 49 C.F.R. § 571.302 and/or Standard No. 302 and State of California Technical Bulletin 117, Section A, Part 1. Because flame retardant additives are typically expensive and may introduce additional processing steps into the method of producing flexible polyurethane foams, the flexible polyurethane foam of this embodiment is cost effective to manufacture relative to conventional flame retardant polyurethane foams. Further, the flexible polyurethane foam of this embodiment has excellent comfort and support properties.

In another embodiment, the isocyanate and/or the isocyanate-reactive component further comprises conventional flame retardant additives. In this embodiment, a preferred conventional flame retardant additive is a halogen free flame retardant additive. More specifically, a halogen free polymeric/oligomeric phosphorus ester flame retardant. In this embodiment, use of the phospholene oxide drastically reduces the amount of conventional flame retardant required to form the flexible polyurethane foam article which meets the flame resistance requirements set forth in 49 C.F.R. § 571.302 and/or Standard No. 302 and State of California Technical Bulletin 117, Section A, Part 1. In this embodiment, the conventional flame retardant, such as a halogen free flame retardant, is typically present in an amount of less than 20, more typically less than 15, still more typically less than 10, and most typically less than 7, parts by weight, based on 100 parts by weight of total polyol present in the isocyanate-reactive component, and the phospholene oxide, such as MPPO, is typically present in an amount of greater than 0.2 and more typically present in an amount of from 0.2 to 1, parts by weight, based on 100 parts by weight of total polyol present in the isocyanate-reactive component. Because flame retardant additives are typically expensive, and the amount required is reduced, and may introduce additional processing steps into the method of producing flexible polyurethane foams, the flexible polyurethane foam of this embodiment is cost effective to manufacture relative to conventional flame retardant polyurethane foams. Further, the flexible polyurethane foam of this embodiment has excellent comfort and support properties.

As set forth above, the instant disclosure also provides a method of producing a flexible polyurethane foam article which exhibits flame resistance. The method typically includes the steps of providing the isocyanate component, providing the isocyanate-reactive component, and providing the phospholene oxide. The method includes the step of reacting the isocyanate and the isocyanate-reactive component in the presence of the blowing agent and an effective amount of the phospholene oxide to form the flexible polyurethane foam article. The polyol and the isocyanate are typically reacted at an isocyanate index of from 90 to 120 and more typically from 95 to 110. The terminology isocyanate index is defined as the ratio of NCO groups in the isocyanate to hydroxyl groups in the isocyanate-reactive component multiplied by 100. The flexible polyurethane foam of the instant disclosure may be produced by mixing the isocyanate and the isocyanate-reactive component to form a mixture at room temperature or at slightly elevated temperatures, e.g. 15 to 30° C. It certain embodiments in which the flexible polyurethane foam is produced in a mold, it is to be appreciated that the isocyanate and the isocyanate-reactive component may be mixed to form the mixture prior to disposing the mixture in the mold. For example, the mixture may be poured into an open mold or the mixture may be injected into a closed mold. Alternatively, the isocyanate and the isocyanate-reactive component may be mixed to form the mixture within the mold. In these embodiments, upon completion of the flexible polyurethane foaming reaction, the flexible polyurethane foam takes the shape of the mold. The flexible polyurethane foam may be produced in, for example, low pressure molding machines, low pressure slabstock conveyor systems, high pressure molding machines, including multi-component machines, high pressure slabstock conveyor systems, and/or by hand mixing.

In certain embodiments, the flexible polyurethane foam is produced or disposed in a slabstock conveyor system, which typically forms flexible polyurethane foam having an elongated rectangular or circular shape. It is particularly advantageous to produce the flexible polyurethane foam in slabstock conveyor systems due to the excellent processability of the flexible polyurethane foam. As known in the art, slabstock conveyor systems typically include mechanical mixing head for mixing individual components, e.g. the isocyanate and the isocyanate-reactive component, a trough for containing a flexible polyurethane foaming reaction, a moving conveyor for flexible polyurethane foam rise and cure, and a fall plate unit for leading expanding flexible polyurethane foam onto the moving conveyor.

The flexible polyurethane foam of the instant disclosure typically has a density of from 1.0 to about 4.0, more typically 1.5 to 2.5 pounds per cubic foot. Unexpectedly, despite having such a density, the flexible polyurethane foam satisfies the requirements set forth in 49 C.F.R. § 571.302, Standard No. 302 and California Technical Bulletin 117. Both 49 C.F.R. § 571.302, Standard No. 302 and California Technical Bulletin 117 are each expressly incorporated by reference in their entirety herein.

Regarding burn resistance testing, the flexible polyurethane foam article of the instant disclosure typically exhibits an average burn resistance of less than 4, more typically less than 3, still more typically less than 1, and most typically 0, inches per minute when measured according to 49 C.F.R. § 571.302, Standard No. 302.

Regarding flame retardance testing, the flexible polyurethane foam article of the instant disclosure typically exhibits excellent flame retardance and satisfies the requirements of California Technical Bulletin 117. The Vertical Open Flame test (Section A, Part 1) of California Technical Bulletin 117 tests for char length, i.e., a distance burned from a flame-exposed end of the flexible polyurethane foam to an upper edge of a resulting void area, and afterflame time, i.e., an amount of time that the flexible polyurethane foam exhibits a flame after an open flame is removed. As such, the results of the Vertical Open Flame test are recorded as a char length and afterflame time. As is described in greater detail below, the flexible polyurethane foam of the instant disclosure exhibits a minimal amount of char length, if at all, and continues to flame for a minimal amount of time, thereby minimizing risks from burn injuries when the flexible polyurethane foam is used in furniture comfort and support articles.

More specifically, the flexible polyurethane foam article, when tested according to according to State of California Technical Bulletin 117, Section A, Part 1:
(1) typically exhibits an average char length of less than or equal to 6, more typically 1, still more typically 0.5, and most typically 0, inches; and
(2) typically exhibits a maximum char length of less than or equal to 8, more typically 1, still more typically 0.5, and most typically 0, inches; and
(3) typically exhibits an average afterflame of less than or equal to 5, more typically 4, and most typically 3, seconds; and
(4) typically exhibits a maximum afterflame of less than or equal to 10, more typically 8.5, and most typically 3.5, seconds; and (5) typically exhibits an average afterglow of less than or equal to 15, more typically less than 10, still more typically less than 5, still more typically less than 1, and most typically 0, seconds;

in each case, before and after aging for 24 hours at 220° F. (104° C.). In other words, the flexible polyurethane foam article of the instant disclosure typically exhibits properties (1) through (5) above when tested before and after aging for 24 hours at 220° F. (104° C.).

In addition, the flexible polyurethane foam article of the instant disclosure typically satisfies requirements of the Smoldering Screening Test as specified in Section D of California Technical Bulletin 117.

As such, the flexible polyurethane foam article minimizes risks from burn injuries caused by furniture articles exposed to open flames, such as candles, matches, or cigarette lighters. Moreover, the flexible polyurethane foam of the instant disclosure not only exhibits excellent flame retardance, but also exhibits excellent comfort and support properties, e.g. flexibility, stability, and durability and also excellent physical properties such as tensile strength, elongation, compression set, and air flow.

For example, the flexible polyurethane foam article typically exhibits excellent compression set in accordance with ASTM D3574. Compression set is a measure of permanent partial loss of original height of the flexible polyurethane foam after compression due to a bending or collapse of cellular structures within the flexible polyurethane foam. Compression set is measured by compressing the flexible polyurethane foam by 90%, i.e., to 10% of original thickness or by compressing the flexible polyurethane foam by 50%, i.e., to 50% of original thickness, and holding the flexible polyurethane foam under various conditions, such as compression at 220° F. for 3 hours at 100% relative humidity. The flexible polyurethane foam article typically has a 90% compression set when aged at 158° F. for 22 hours of less than 95, more typically of from 3 to 80, and most typically from 10 to 30, %. Further, the flexible polyurethane foam article typically has a 50% compression set when aged at 220° F. for 3 hours at 100% relative humidity of less than 50%.

Further, the flexible polyurethane foam article typically exhibits excellent air flow when measured for porosity according to the air flow test of ASTM D3574/D737. The Frazier air flow test measures the ease with which air passes through the flexible polyurethane foams. The air flow test consists of clamping a sample over an open chamber and creating a specified constant air-pressure differential. The air-flow value is the rate of air flow, in cubic feet per minute per square foot, required to maintain the constant air-pressure differential. The flexible polyurethane foam article typically an air flow value of greater than 100 and more typically of from 100 to 250, cfm/ft$^2$.

The following examples are intended to illustrate the instant disclosure and are not to be viewed in any way as limiting to the scope of the instant disclosure.

EXAMPLES

Examples 1-6

Examples 1-6 are flexible polyurethane foam articles formed in accordance with the instant disclosure. More specifically, Examples 1-6 are highly resistant (HR) molded foams which are formed in accordance with the instant disclosure. Comparative Examples 1 and 2 are polyurethane foam articles (HR Molded foam articles) not formed in accordance with the instant disclosure, which are included for comparative purposes.

Referring now to Table 1, a series of polyurethane systems including an Isocyanate-reactive component and an Isocyanate are described. The polyurethane systems of Table 1 are used to form Examples 1-6 and Comparative Examples 1 and 2. The amount and type of each component used to form each Isocyanate-reactive Component is indicated in Table 1 below with all values in parts by weight, based on 100 parts by weight of total polyol present in each Isocyanate-reactive Component, i.e., the parts by weight for each component are not normalized to 100 parts of the total weight of the Isocyanate-reactive Component. Table 1 also includes an isocyanate index at which the Isocyanate-reactive Component and the Isocyanate are reacted to form Examples 1-6 and Comparative Examples 1 and 2.

Each of the Isocyanate-reactive Components of Examples 1-6 and Comparative Examples 1 and 2 are mixed with a drill press having a high sheer mixing blade attached thereto to form a reaction mixture. More specifically, each of the Isocyanate-reactive Components (at a temperature of about 75° F.) and the Isocyanate (at a temperature of about 75° F.) are mixed at an isocyanate index of 100 and an a mix ratio of 435/185.

In turn, the reaction mixture is deposited into a mold and reacts to form 15×15×4 inch blocks of polyurethane foam, each of which weighs about 500 grams. As such, the polyurethane foams of Examples 1-6 and Comparative Examples 1 and 2 are formed. Examples 1-6 and Comparative Examples 1 and 2 are formed with a demold time of 5 minutes and a vent time of approximately 40 seconds. Once molded, Examples 1-6 and Comparative Examples 1 and 2 are cured for 24-48 hours. Examples 1-6 and Comparative Examples 1 and 2 are then cut into samples for use in various tests to determine the values of various comfort and support properties, i.e., physical properties, and flammability properties, the results of which are also included in Table 1.

The samples are tested to determine a density at 25° C. and 50% relative humidity in accordance with ASTM D3574, a 25% indentation force deflection (IFD), and a 65% IFD. The 25% IFD is defined as an amount of force in pounds required to indent a 50 in$^2$, round indenter foot into the sample a distance of 25% of the sample's thickness. Similarly, a 65% IFD is defined as the amount of force in pounds required to indent the indenter foot into the sample a distance of 65% of the sample's thickness.

The samples are also tested for tensile strength, tear strength, and elongation in accordance with ASTM D3574. Tensile strength, tear strength, and elongation properties describe the ability of the flexible polyurethane foam to withstand handling during manufacturing or assembly operations. Specifically, tensile strength is the force in lbs/in$^2$ required to stretch the flexible polyurethane foam to a breaking point. Tear strength is the measure of the force required to continue a tear in the flexible polyurethane foam after a split or break has been started, and is expressed in lbs/in (ppi). Finally, elongation is a measure of the percent that the flexible polyurethane foam will stretch from an original length before breaking.

The resilience of the samples is measured in accordance with ASTM D3574 by dropping a steel ball from a reference height onto the samples and measuring a peak height of ball rebound. The peak height of ball rebound, expressed as a percentage of the reference height, is the resilience.

The samples are also evaluated for compression set in accordance with ASTM D3574. Compression set is a measure of permanent partial loss of original height of the flexible polyurethane foam after compression due to a bending or collapse of cellular structures within the flexible polyurethane foam. Compression set is measured by compressing the flexible polyurethane foam by 90%, i.e., to 10% of original thickness, and holding the flexible polyurethane foam under such compression at 70° C. for 22 hours. Additionally, the flexible polyurethane foams also subject to humid aging for compression set, 50%. Humid aging is an accelerated aging test method under conditions of 122° F. for 22 hours at 100% relative humidity.

Further, the samples are measured for porosity according to the Frazier Air Flow/Air Flow tests of ASTM D3574 and D737. The Frazier air flow test measures the ease with which air passes through the flexible polyurethane foams. The air flow test consists clamping a sample over an open chamber and creating a specified constant air-pressure differential. The Frazier air-flow value is the rate of air flow, in cubic feet per minute per square foot, required to maintain the constant air-pressure differential. Said differently, the air flow value is the volume of air per second at standard temperature and pressure required to maintain a constant air-pressure differential of 125 Pa across a 2.75 diameter sample. The Air Flow, in cubic feet per minute is the air flow through the flexible polyurethane foam.

Furthermore, the samples are tested for hardness according to ASTM D3574 C J2, D3574-11, "Standard Test Methods for Flexible Cellular Materials—Slab, Bonded, and Molded Urethane Foams", test C—compression force deflection test after aging for 5 hours at 100% RH (Aging Test—steam autoclave testing) and aging at for 5 hours at 120° C. (250° F.) (122.1.2 Procedure J2). Values are reported in % of original value retained.

Importantly, the samples are also evaluated for flammability. Each sample is tested to determine compliance with 49 C.F.R. § 571.302, Standard No. 302. Each sample is also tested to determine compliance with the California Technical Bulletin 117, Section A, Part 1 requirements, i.e., the Vertical Open Flame test. Specifically, the Vertical Open Flame test measures an amount of time that the samples exhibit a flame after an open flame is removed, i.e., an afterflame time. For the Vertical Open Flame test, the samples are suspended vertically 0.75 inches above a burner and a flame is applied vertically at the middle of a lower edge of the samples for 12 seconds. The results of the Vertical Open Flame test are recorded as a (1) char length, i.e., a distance from the flame-exposed end of the sample to an upper edge of a resulting void area and a (2) afterflame, i.e., a time after exposure to the flame for which the sample emits flame and/or drops fragments. The vertical open flame test is performed on original and heat aged conditioned samples.

TABLE 1

|  | Comp. Ex. 1 | Comp. Ex. 2 | Ex.1 | Ex. 2 | Ex. 3 | Ex. 4 | Ex. 5 | Ex. 6 |
|---|---|---|---|---|---|---|---|---|
| Isocyanate-reactive component | | | | | | | | |
| Polyol A | 30 | 30 | 30 | 30 | 30 | 30 | 30 | 30 |
| Polyol B | 70 | 70 | 70 | 70 | 70 | 70 | 70 | 70 |
| Cross-linking Agent | 1.6 | 1.6 | 1.6 | 1.6 | 1.6 | 1.6 | 1.6 | 1.6 |
| Catalyst A | 0.35 | 0.35 | 0.35 | 0.35 | 0.35 | 0.35 | 0.35 | 0.35 |
| Catalyst B | 0.08 | 0.08 | 0.08 | 0.08 | 0.08 | 0.08 | 0.08 | 0.08 |
| Surfactant A | 1 | 1 | 1 | 1 | 1 | 1 | 1 | 1 |
| Phospholene Oxide A | — | — | 1.2 | — | — | — | — | — |
| Phospholene Oxide B | — | — | — | 0.4 | 0.8 | 1.6 | 3.2 | 5 |
| Solvent | — | 3.8 | — | — | — | — | — | — |
| Blowing Agent | 3.71 | 3.71 | 3.71 | 3.71 | 3.71 | 3.71 | 3.71 | 3.71 |
| Isocyanate | | | | | | | | |
| Isocyanate | 45.4 | 45.4 | 45.4 | 45.4 | 45.4 | 45.4 | 45.4 | 45.4 |
| Isocyanate Index | 100 | 100 | 100 | 100 | 100 | 100 | 100 | 100 |
| Physical Properties | | | | | | | | |
| Density (lbs/ft$^3$) | 1.82 | 1.85 | 1.85 | 1.89 | 1.83 | 1.86 | 1.83 | 1.84 |
| 25% IFD (lbf) | 54 | 51 | 54 | 56 | 53 | 53 | 50 | 52 |
| 65% IFD (lbf) | 158 | 150 | 157 | 158 | 152 | 149 | 144 | 148 |
| Tensile Strength (psi) | 26 | 24 | 25 | 26 | 26 | 23 | 22 | 25 |
| Tensile Strength, Heat Aged (%) | 26 | 28 | 28 | 29 | 28 | 26 | 26 | 24 |
| Block Tear (ppi) | 4.4 | 4.2 | 4.2 | 4.2 | 3.9 | 4.1 | 4.1 | 3.9 |
| Elongation (%) | 73 | 64 | 65 | 67 | 72 | 62 | 58 | 67 |
| Elongation, Heat Aged (%) | 71 | 70 | 80 | 82 | 77 | 71 | 65 | 69 |
| SAG Factor | 3.0 | 3.0 | 3.0 | 2.8 | 2.9 | 2.9 | 2.9 | 2.9 |
| Resilience (%) | 42 | 41 | 42 | 43 | 43 | 42 | 39 | 42 |
| Comp Set 50%, Hum. Aged (%) | 46 | 48 | 45 | 46 | 47 | 46 | 48 | 74 |
| Comp. Set 90%, Ambient (%) | 22 | 88 | 25 | 23 | 63 | 81 | 88 | 87 |
| Frazier Air Flow (cfm/ft$^2$) | 135 | 163 | 149 | 119 | 124 | 140 | 145 | 104 |
| Burn Resistance (C.F.R. § 571.302, Standard No. 302) | | | | | | | | |
| Distance Burned (in) | 10.2 | 1.9 | 4.4 | 2.0 | 0.6 | 0.6 | 0.6 | 0.8 |
| Burn Rate (in/min) | 3.4 | 0.0 | 2.6 | 0.5 | 0.0 | 0.0 | 0.0 | 0.0 |
| Flame Retardance (State of California Technical Bulletin 117, Section A, Part 1) | | | | | | | | |
| Char Length, Avg. (in) | 14 | 20 | 8.3 | 0.2 | 0.0 | 0.0 | 0.0 | 0.0 |
| Char Length, Max. (in) | 14.5 | 21 | 11 | 0.71 | 0.0 | 0.0 | 0.0 | 0.0 |

TABLE 1-continued

|  | Comp. Ex. 1 | Comp. Ex. 2 | Ex.1 | Ex. 2 | Ex. 3 | Ex. 4 | Ex. 5 | Ex. 6 |
|---|---|---|---|---|---|---|---|---|
| Afterflame Avg. (sec) | 12 | 11 | 6.5 | 2.5 | 2.5 | 2.6 | 2.5 | 2.4 |
| Afterflame Max. (sec) | 12 | 12 | 8.1 | 2.9 | 3.0 | 2.9 | 2.9 | 3.1 |

Polyol A is a primary hydroxyl terminated polyether polyol having a hydroxyl number of from 20 to 40 mg KOH/g.
Polyol B is a graft polyether triol including approximately 43% acrylonitrile/styrene copolymer and having a hydroxyl number of from 15 to 35 mg KOH/g.
Cross-linking Agent is diethanolamine.
Catalyst A is an amine catalyst.
Catalyst B is a solution of 70% by weight bis-(2-dimethylaminoethyl)ether and 30% by weight dipropylene glycol.
Surfactant A is silicone glycol copolymer.
Phospholene Oxide A is 3-methyl-1-phenyl-2-phospholene oxide (MPPO).
Phospholene Oxide B is a solution comprising 23.9 parts by weight MPPO and 76.1 parts by weight triethyl phosphate (TEP).
Solvent is TEP.
Blowing Agent A is water.
Isocyanate is toluene diisocyanate.

Referring now to Table 1, the flexible polyurethane foams of Examples 1-6 exhibit excellent flame resistance without addition of conventional flame retardant additives. Further, the flexible polyurethane foams of Examples 1-6 exhibit excellent comfort and support properties. In fact, the flame resistance of Examples 2-5 is particularly good and the Examples respectively include only 0.1, 0.2, 0.4, and 0.8 parts by weight phospholene oxide based on 100 parts by weight of total polyol present in the isocyanate-reactive component. Accordingly, a minimal amount of phospholene oxide significantly impacts the flame resistance of the flexible polyurethane foams of Examples 2-5.

Examples 7-21

Examples 7-21 are flexible polyurethane foam articles which are formed in accordance with the instant disclosure. More specifically, Examples 7-21 are conventional slab stock foams which are formed in accordance with the instant disclosure. Comparative Examples 3-14 are flexible polyurethane foam articles (conventional slab stock foam articles) which are not formed in accordance with the instant disclosure. Of course, Comparative Examples 3-14 are included for comparative purposes.

Referring now to Tables 2-5, a series of polyurethane systems including an Isocyanate-reactive component and an Isocyanate are described. The polyurethane systems of Tables 2-5 are used to form Examples 7-21 and Comparative Examples 3-14. The amount and type of each component used to form each Isocyanate-reactive Component is indicated in Tables 2-5 below with all values in parts by weight, based on 100 parts by weight of total polyol present in each Isocyanate-reactive Component, i.e., the parts by weight for each component are not normalized to 100 parts of the total weight of the Isocyanate-reactive Component. Tables 2-5 also include an isocyanate index at which the Isocyanate-reactive Component and the Isocyanate are reacted to form Examples 7-21 and Comparative Examples 3-14.

Each of the Isocyanate-reactive Components of Examples 7-21 and Comparative Examples 3-14 are compounder via in a high shear mixer (a variable speed mixer with a high shear mix blade) to form a reaction mixture. More specifically, each of the Isocyanate-reactive Components (at a temperature of about 75° F.) are mixed and, once mixed, are then mixed with the Isocyanate (at a temperature of about 75° F.) are hand mixed at an isocyanate index of 110.

In turn, the reaction mixture is deposited into a 5-gallon pail liner and reacts to form the polyurethane foams of Examples 7-21 and Comparative Examples 3-14. Examples 7-21 and Comparative Examples 3-14 are then cut into samples for use in various tests to determine the values of various comfort and support properties, i.e., physical properties, and flammability properties, the results of which are also included in Tables 2-5 below.

TABLE 2

|  | Cp. Ex. 3 | Cp. Ex. 4 | Cp. Ex. 5 | Ex. 7 | Cp. Ex. 6 | Cop. Ex. 7 | Cp. Ex. 8 | Ex. 8 |
|---|---|---|---|---|---|---|---|---|
| Isocyanate-reactive Component ||||||||||
| Polyol C | 100.0 | 100.0 | 100.0 | 100.0 | 100.0 | 100.0 | 100.0 | 100.0 |
| Additive A | 5.0 | 5.0 | 5.0 | 5.0 | 5.0 | 5.0 | 5.0 | 5.0 |
| Flame Retardant A | 18 | 12 | 6 | 6 | 18 | 12 | 6 | 6 |
| Phospholene Oxide B | 0.0 | 0.0 | 0.0 | 1.42 | 0.0 | 0.0 | 0.0 | 1.42 |
| Surfactant B | 1.0 | 1.0 | 1.0 | 1.0 | 1.0 | 1.0 | 1.0 | 1.0 |
| Catalyst A | 0.2 | 0.2 | 0.2 | 0.2 | 0.2 | 0.2 | 0.2 | 0.2 |
| Catalyst B | 0.1 | 0.1 | 0.1 | 0.1 | 0.1 | 0.1 | 0.1 | 0.1 |
| Catalyst C | 0.5 | 0.5 | 0.5 | 0.5 | 0.4 | 0.4 | 0.4 | 0.4 |
| Blowing Agent | 4.2 | 4.2 | 4.2 | 4.2 | 4.2 | 4.2 | 4.2 | 4.2 |
| Isocyanate ||||||||||
| Isocyanate | 55 | 55 | 55 | 55 | 55 | 55 | 55 | 55 |
| Isocyanate Index | 110 | 110 | 110 | 110 | 110 | 110 | 110 | 110 |

TABLE 2-continued

|  | Cp. Ex. 3 | Cp. Ex. 4 | Cp. Ex. 5 | Ex. 7 | Cp. Ex. 6 | Cop. Ex. 7 | Cp. Ex. 8 | Ex. 8 |
|---|---|---|---|---|---|---|---|---|
| Handmix Observations | | | | | | | | |
| Cream Time (sec) | 10 | 10 | 10 | 10 | 10 | 10 | 12 | 11 |
| Rise Time (min:sec) | 1:30 | 1:45 | 1:31 | 1:29 | 1:27 | 1:29 | 1:20 | 1:26 |
| Physical Properties | | | | | | | | |
| Density (lbs/ft$^3$) | 1.29 | 1.17 | — | 1.12 | 1.30 | 1.21 | 1.12 | 1.19 |
| 25% IFD (lbf) | 25 | 26 | — | 25 | 21 | 24 | 30 | 23 |
| 65% IFD (lbf) | 46 | 50 | — | 51 | 34 | 40 | 56 | 39 |
| Tensile Strength (psi) | 9.2 | 10.4 | — | 11.5 | 9.1 | 10.3 | 10.5 | 12.0 |
| Tensile Strength, Heat Aged (%) | 10.1 | 12.8 | — | 12.5 | 11.2 | 13.1 | 14.0 | 12.4 |
| Block Tear (ppi) | 1.3 | 1.6 | — | 1.3 | 1.5 | 1.6 | 1.5 | 1.9 |
| Elongation (%) | 112 | 132 | — | 141 | 127 | 128 | 117 | 142 |
| Elongation, Heat Aged (%) | 116 | 156 | — | 165 | 146 | 163 | 189 | 167 |
| SAG Factor | 1.9 | 2.0 | — | 2.0 | 1.6 | 1.6 | 1.9 | 1.7 |
| Resilience (%) | 58 | 52 | — | 49 | 64 | 63 | 55 | 63 |
| Comp. Set 90%, Ambient (%) | 17 | 38 | — | 85 | 6 | 7 | 12 | 17 |
| Air Flow (cfm/ft$^2$) | 0.23 | 0.14 | — | 0.13 | 4.43 | 2.10 | 0.23 | 4.27 |
| Hardness 5 hrs at 100% RH, 250° F. 50% CFD, % of Original | 80 | 77 | — | 75 | 80 | 77 | 85 | 80 |
| Flame Retardance (State of California Technical Bulletin 117, Section A, Part 1) | | | | | | | | |
| Avg. Afterflame (sec) | 0.0 | 0.0 | — | 0.0 | 0.0 | 0.0 | 2.0 | 1.3 |
| Avg. Char Length (in) | 3.4 | 3.8 | — | 4.5 | 3.6 | 3.7 | 7.9 | 4.8 |

Polyol C is a polyether triol having a hydroxyl number of 56 mg KOH/g.
Additive A is a solution of 97% methyl formate 3% methanol.
Surfactant B is an alkyl-pendant organosilicone surfactant.
Catalyst C is stannous octoate.
Flame Retardant A is halogen free polymeric/oligomeric phosphorus ester flame retardant.

Referring now to Table 2, the flexible polyurethane foams of Examples 7 and 8 exhibit excellent flame resistance. The addition of just 1.42 parts Phospholene Oxide B (0.34 parts MPPO) in Examples 7 and 8 allow for a 50% reduction in the use of Flame Retardant A, a conventional halogen free flame retardant additive, while still meeting the Avg. Afterflame (<5 sec) and Avg. Char Length (<6 in) standards set forth in State of California Technical Bulletin 117, Section A, Part 1. In contrast to Examples 7 and 8, Comparative Examples 5 and 8, which include 6 parts Flame Retardant A but no MPPO, do not meet the standards set forth in State of California Technical Bulletin 117, Section A, Part 1. Further, the flexible polyurethane foams of Examples 7 and 8 exhibit excellent comfort and support properties. Accordingly, a minimal amount of phospholene oxide reduces the amount of conventional flame retardant additive required to achieve flame resistance under State of California Technical Bulletin 117, Section A, Part 1 and does not negatively impact the excellent comfort and support properties of the flexible polyurethane foams of Examples 7 and 8.

TABLE 3

|  | Cp. Ex. 9 | Cp. Ex. 10 | Cp. Ex. 11 | Ex. 9 | Cp. Ex. 12 | Cp. Ex. 13 | Cp. Ex. 14 | Ex. 10 |
|---|---|---|---|---|---|---|---|---|
| Isocyanate-reactive Component | | | | | | | | |
| Polyol C | 100.0 | 100.0 | 100.0 | 100.0 | 100.0 | 100.0 | 100.0 | 100.0 |
| Additive A | 5.0 | 5.0 | 5.0 | 5.0 | 5.0 | 5.0 | 5.0 | 5.0 |
| Flame Retardant A | 18.0 | 12.0 | 6 | 6.0 | 18.0 | 12.0 | 6 | 6.0 |
| Phospholene Oxide B | 0.0 | 0.0 | 0.0 | 1.42 | 0.0 | 0.0 | 0.0 | 1.42 |
| Surfactant B | 1.0 | 1.0 | 1.0 | 1.0 | 1.0 | 1.0 | 1.0 | 1.0 |
| Catalyst A | 0.2 | 0.2 | 0.2 | 0.2 | 0.2 | 0.2 | 0.2 | 0.2 |
| Catalyst B | 0.1 | 0.1 | 0.1 | 0.1 | 0.1 | 0.1 | 0.1 | 0.1 |
| Catalyst C | 0.3 | 0.3 | 0.3 | 0.3 | 0.2 | 0.2 | 0.2 | 0.2 |
| Blowing Agent | 4.2 | 4.2 | 4.2 | 4.2 | 4.2 | 4.2 | 4.2 | 4.2 |
| Isocyanate | | | | | | | | |
| Isocyanate | 55.0 | 55.0 | 10 | 55.0 | 55.0 | 55.0 | 55.0 | 55.0 |
| Isocyanate Index | 110 | 110 | 1:40 | 110 | 110 | 110 | 110 | 110 |
| Handmix Observations | | | | | | | | |
| Cream Time (sec) | 11 | 10 | 10 | 10 | 10 | 10 | 10 | 10 |
| Rise Time (min:sec) | 1:45 | 1:35 | 1:40 | 1:17 | 2:03 | 1:25 | 1:39 | 1:39 |

TABLE 3-continued

|  | Cp. Ex. 9 | Cp. Ex. 10 | Cp. Ex. 11 | Ex. 9 | Cp. Ex. 12 | Cp. Ex. 13 | Cp. Ex. 14 | Ex. 10 |
|---|---|---|---|---|---|---|---|---|
| Physical Properties | | | | | | | | |
| Density (lbs/ft$^3$) | 1.27 | 1.23 | 1.20 | 1.20 | 1.25 | 1.24 | 1.16 | 1.15 |
| 25% IFD (lbf) | 19 | 20 | 23 | 23 | 15 | 17 | 18 | 18 |
| 65% IFD (lbf) | 31 | 34 | 41 | 38 | 28 | 32 | 30 | 32 |
| Tensile Strength (psi) | 9.1 | 9.8 | 9.5 | 9.6 | — | 10.9 | 8.8 | 10.6 |
| Tensile Strength, Heat Aged (%) | 11.2 | 12.2 | 11.6 | 11.5 | — | 12.7 | 12.1 | 11.6 |
| Block Tear (ppi) | 1.6 | 1.5 | 1.9 | 1.5 | — | 1.7 | 1.9 | 1.9 |
| Elongation (%) | 143 | 134 | 108 | 101 | — | 155 | 123 | 142 |
| Elongation, Heat Aged (%) | 144 | 159 | 145 | 146 | — | 136 | 182 | 157 |
| SAG Factor | 1.6 | 1.7 | 1.7 | 1.6 | 1.9 | 1.8 | 1.7 | 1.8 |
| Resilience (%) | 66 | 64 | 67 | 65 | 71 | 71 | 68 | 68 |
| Comp. Set 90%, Ambient (%) | 5 | 5 | 6 | 29 | — | 5 | 6 | 8 |
| Air Flow (cfm) | 7.79 | 7.63 | 5.13 | 4.77 | — | 8.63 | 9.27 | 8.63 |
| Hardness 5 hrs at 100% RH, 250° F. 50% CFD, % of Original | 81 | 81 | 87 | 82 | — | 82 | 85 | 86 |
| Flame Retardance (State of California Technical Bulletin 117, Section A, Part 1) | | | | | | | | |
| Avg. Afterflame (sec) | 0 | 1.4 | 8.2 | 0.7 | 0 | 0 | 3.6 | 1.9 |
| Avg. Char Length (in) | 4.0 | 3.6 | 12.0 | 4.3 | 4.4 | 4.4 | 8.5 | 4.6 |

Referring now to Table 3, the flexible polyurethane foams of Examples 9 and 10 exhibit excellent flame resistance. Notably, the addition of just 1.42 parts Phospholene Oxide B (0.34 parts MPPO) in Examples 9 and 10 allow for a 50% reduction in the use of Flame Retardant A, a conventional flame retardant additive, while still meeting the Avg. Afterflame (<5 sec) and Avg. Char Length (<6 in) required by State of California Technical Bulletin 117, Section A, Part 1. In contrast to Examples 9 and 10, Comparative Examples 11 and 14, which include 6 parts Flame Retardant A but no MPPO, do not meet the standards set forth in State of California Technical Bulletin 117, Section A, Part 1. Further, the flexible polyurethane foams of Examples 9 and 10 exhibit excellent comfort and support properties. Accordingly, a minimal amount of phospholene oxide reduces the amount of conventional flame retardant additive required to achieve flame resistance under State of California Technical Bulletin 117, Section A, Part 1 and does not negatively impact the excellent comfort and support properties of the flexible polyurethane foams of Examples 9 and 10.

TABLE 4

|  | Ex. 11 | Ex. 12 | Ex. 13 | Ex. 14 | Ex. 15 | Ex. 16 | Ex. 17 | Ex. 18 |
|---|---|---|---|---|---|---|---|---|
| Isocyanate-reactive Component | | | | | | | | |
| Polyol C | 100.0 | 100.0 | 100.0 | 100.0 | 100.0 | 100.0 | 100.0 | 100.0 |
| Additive A | 5.0 | 5.0 | 5.0 | 5.0 | 5.0 | 5.0 | 5.0 | 5.0 |
| Flame Retardant A | 6.0 | 6.0 | 6.0 | 6.0 | 6.0 | 6.0 | 6.0 | 6.0 |
| Phospholene Oxide B | 0.89 | 0.89 | 0.89 | 0.89 | 0.35 | 0.35 | 0.35 | 0.35 |
| Surfactant B | 1.0 | 1.0 | 1.0 | 1.0 | 1.0 | 1.0 | 1.0 | 1.0 |
| Catalyst A | 0.2 | 0.2 | 0.2 | 0.2 | 0.2 | 0.2 | 0.2 | 0.2 |
| Catalyst B | 0.1 | 0.1 | 0.1 | 0.1 | 0.1 | 0.1 | 0.1 | 0.1 |
| Catalyst C | 0.5 | 0.4 | 0.3 | 0.2 | 0.5 | 0.4 | 0.3 | 0.2 |
| Blowing Agent | 4.2 | 4.2 | 4.2 | 4.2 | 4.2 | 4.2 | 4.2 | 4.2 |
| Isocyanate | | | | | | | | |
| Isocyanate | 55.0 | 55.0 | 55.0 | 55.0 | 55.0 | 55.0 | 55.0 | 55.0 |
| Isocyanate Index | 110 | 110 | 110 | 110 | 110 | 110 | 110 | 110 |
| Handmix Observations | | | | | | | | |
| Cream Time (sec) | 10 | 10 | 10 | 10 | 10 | 10 | 12 | 12 |
| Rise Time (min:sec) | 1:30 | 1:26 | 1:20 | 1:48 | 1:45 | 1:33 | 1:25 | 1:35 |
| Physical Properties | | | | | | | | |
| Density (lbs/ft$^3$) | 1.09 | 1.17 | 1.16 | 1.15 | — | 1.12 | 1.20 | 1.19 |
| 25% IFD (lbf) | 29 | 25 | 23 | 16 | — | 31 | 22 | 19 |
| 65% IFD (lbf) | 60 | 43 | 37 | 29 | — | 57 | 39 | 33 |
| Tensile Strength (psi) | 10.8 | 11.1 | 10.2 | 10.9 | — | — | 10.6 | 9.9 |
| Tensile Strength, Heat Aged (%) | 12.1 | 12.2 | 11.5 | — | — | — | 12.3 | 12.0 |
| Block Tear (ppi) | 1.7 | 1.8 | 1.6 | — | — | 1.1 | 1.5 | 1.8 |
| Elongation (%) | 117 | 121 | 115 | 105 | — | — | 123 | 125 |
| Elongation, Heat Aged (%) | 163 | 153 | 154 | — | — | — | 161 | 170 |
| SAG Factor | 2.1 | 1.7 | 1.7 | 1.8 | — | 1.8 | 1.7 | 1.8 |
| Resilience (%) | 45 | 64 | 64 | 68 | — | 54 | 65 | 69 |
| Comp. Set 90%, Ambient (%) | 80 | 54 | 6 | — | — | 77 | 5 | 7 |

TABLE 4-continued

|  | Ex. 11 | Ex. 12 | Ex. 13 | Ex. 14 | Ex. 15 | Ex. 16 | Ex. 17 | Ex. 18 |
|---|---|---|---|---|---|---|---|---|
| Air Flow (cfm) | 0.13 | 2.2 | 6.5 | — | — | 0.29 | 7.07 | 8.87 |
| Hardness 5 hrs at 100% RH, 250° F. 50% CFD, % of Original | 84 | 87 | 88 | — | — | 81 | 91 | 88 |
| Flame Retardance (State of California Technical Bulletin 117, Section A, Part 1) | | | | | | | | |
| Avg. Afterflame (sec) | 3.9 | 2.7 | 8.4 | 1.8 | — | 4.3 | 9.0 | 5.8 |
| Avg. Char Length (in) | 12.0 | 7.8 | 12.0 | 5.8 | — | 8.5 | 12.0 | 9.4 |

Referring now to Table 4, the flexible polyurethane foams of Examples 11-18 are formed with 2 levels of Phospholene Oxide B, 0.89 parts (0.21 parts MPPO) and 0.35 parts (0.08 parts MPPO), respectively. As such, although the addition of MPPO improves Avg. Afterflame and Avg. Char Length of this particular polyurethane foam system, MPPO amounts of greater than about 0.2 parts are required to meet the requirements for Avg. Afterflame (<5 sec) and Avg. Char Length (<6 in) required by State of California Technical Bulletin 117, Section A, Part 1.

in the use of Flame Retardant A, a conventional flame retardant additive, while still meeting the Avg. Afterflame (<5 sec) and Avg. Char Length (<6 in) standards set forth in State of California Technical Bulletin 117, Section A, Part 1. As an exception, Example 19 does not meet the because Avg. Char Length (<6 in) standards set forth in State of California Technical Bulletin 117, Section A, Part 1 likely because of its low air flow value. In contrast to Examples 20 and 21, Comparative Examples 8 and 11, which include 6 parts Flame Retardant A but no MPPO, do not meet the

TABLE 5

|  | Cp. Ex. 5 | Ex. 19 | Cp. Ex. 8 | Ex. 20 | Cp. Ex. 11 | Ex. 21 |
|---|---|---|---|---|---|---|
| Isocyanate-reactive Component | | | | | | |
| Polyol C | 100.0 | 100.0 | 100.0 | 100.0 | 100.0 | 100.0 |
| Additive A | 5.0 | 5.0 | 5.0 | 5.0 | 5.0 | 5.0 |
| Flame Retardant A | 6.0 | 6.0 | 6.0 | 6.0 | 6.0 | 6.0 |
| Phospholene Oxide C | 0.0 | 0.4 | 0.0 | 0.4 | 0.0 | 0.4 |
| Surfactant B | 1.0 | 1.0 | 1.0 | 1.0 | 1.0 | 1.0 |
| Catalyst A | 0.2 | 0.2 | 0.2 | 0.2 | 0.2 | 0.2 |
| Catalyst B | 0.1 | 0.1 | 0.1 | 0.1 | 0.1 | 0.1 |
| Catalyst C | 0.5 | 0.5 | 0.4 | 0.4 | 0.3 | 0.3 |
| Blowing Agent | 4.2 | 4.2 | 4.2 | 4.2 | 4.2 | 4.2 |
| Isocyanate | | | | | | |
| Isocyanate | 55.0 | 55.0 | 55.0 | 55.0 | 55.0 | 55.0 |
| Isocyanate Index | 110 | 110 | 110 | 110 | 110 | 110 |
| Handmix Observations | | | | | | |
| Cream Time (sec) | 10 | 14 | 12 | 10 | 10 | 10 |
| Rise Time (min:sec) | 1:31 | 1:25 | 1:20 | 1:29 | 1:40 | 1:21 |
| Physical Properties | | | | | | |
| Density (lbs/ft$^3$) | — | 1.08 | 1.12 | 1.13 | 1.20 | 1.16 |
| 25% IFD (lbf) | — | 25 | 30 | 28 | 23 | 21 |
| 65% IFD (lbf) | — | 43 | 56 | 50 | 41 | 35 |
| Tensile Strength (psi) | — | 9.3 | 10.5 | 10.2 | 9.5 | 9.1 |
| Tensile Strength, Heat Aged (%) | — | 1.17 | 14.0 | 11.9 | 11.6 | 10.4 |
| Block Tear (ppi) | — | 1.5 | 1.5 | 1.6 | 1.9 | 1.8 |
| Elongation (%) | — | 105 | 117 | 108 | 108 | 110 |
| Elongation, Heat Aged (%) | — | 161 | 189 | 146 | 145 | 124 |
| SAG Factor | — | 1.7 | 1.9 | 1.8 | 1.7 | 1.7 |
| Resilience (%) | — | 54 | 55 | 57 | 67 | 67 |
| Comp. Set 90%, Ambient (%) | — | 84 | 12 | 7 | 6 | 7 |
| Air Flow (cfm) | — | 0.18 | 0.23 | 0.62 | 5.13 | 7.13 |
| Hardness 5 hrs at 100% RH, 250° F. 50% CFD, % of Original | — | 77 | 85 | 78 | 87 | 85 |
| Flame Retardance (State of California Technical Bulletin 117, Section A, Part 1) | | | | | | |
| Avg. Afterflame (sec) | — | 2.6 | 2 | 1.7 | 8.2 | 2.1 |
| Avg. Char Length (in) | — | 8.4 | 7.9 | 5.2 | 12.0 | 4.9 |

Phospholene Oxide C is 80% Crude MPPO.

Referring now to Table 5, the flexible polyurethane foams of Examples 20 and 21 exhibit excellent flame resistance. Notably, the addition of just 0.4 parts Phospholene Oxide C (0.3 parts MPPO) in Example 20 allows for a 50% reduction standards set forth in State of California Technical Bulletin 117, Section A, Part 1. Further, the flexible polyurethane foams of Examples 20 and 21 exhibit excellent comfort and support properties. Accordingly, a minimal amount of phospholene oxide reduces the amount of conventional flame retardant additive required to achieve flame resistance under State of California Technical Bulletin 117, Section A, Part 1 and does not negatively impact the excellent comfort and support properties of the flexible polyurethane foams of Examples 19 and 20.

TABLE 6

| Example No. | PBW Flame Retardant A | PBW MPPO | Air Flow (cfm) | Compression Set | Flame Retardance (Ca Technical Bulletin 117, Section A, Part 1) |
|---|---|---|---|---|---|
| Ex. 7 | 6.0 | 0.3 | 0.1 | 85 | Pass |
| Cp. Ex. 8 | 6.0 | 0.0 | 0.2 | 12 | Fail |
| Ex. 8 | 6.0 | 0.3 | 4.3 | 17 | Pass |
| Ex. 9 | 6.0 | 0.3 | 4.8 | 29 | Pass |
| Cp. Ex. 11 | 6.0 | 0.0 | 5.1 | 6 | Fail |
| Ex. 10 | 6.0 | 0.3 | 8.6 | 8 | Pass |
| Cp. Ex. 14 | 6.0 | 0.0 | 9.3 | 6 | Fail |

Table 6 above includes data from Tables 2-5 and sets forth comparisons of polyurethane foam articles having similar air flow properties. Generally, the air flow properties of a polyurethane foam article impact its flame resistance. Example 7 and Comparative Example 8 have similar air flow properties and include 6 parts Flame Retardant A. However, Example 7 passes Flame Retardance Testing under California Technical Bulletin 117, Section A, Part 1 and Comparative Example 8 does not. Example 7 exhibits excellent flame resistance because it includes 0.3 parts MPPO, Comparative Example 8 exhibits poor flame resistance because it does not include MPPO.

Still referring to Table 6 above, Examples 8 and 9 and Comparative Example 11 have similar air flow properties and include 6 parts Flame Retardant A. However, Examples 8 and 9 pass Flame Retardance Testing under California Technical Bulletin 117, Section A, Part 1 and Comparative Example 11 does not. Examples 8 and 9 exhibit excellent flame resistance because they include 0.3 parts MPPO, Comparative Example 11 exhibits poor flame resistance because it does not include MPPO.

Likewise, Example 10 and Comparative Example 14 have similar air flow properties and include 6 parts Flame Retardant A. However, Example 10 passes Flame Retardance Testing under California Technical Bulletin 117, Section A, Part 1 and Comparative Example 14 does not. Example 10 exhibits excellent flame resistance because it includes 0.3 parts MPPO, Comparative Example 8 exhibits poor flame resistance because it does not include MPPO.

In view of Table 6 above and the air flow properties of the exemplary polyurethane foams set forth therein, inclusion of a minimal amount of MPPO and a minimal amount of conventional flame retardant additive provides polyurethane foam which exhibits excellent flame resistance under State of California Technical Bulletin 117, Section A, Part 1 and has excellent comfort and support properties.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the instant disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the instant disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

What is claimed is:

1. A method of producing a flexible polyurethane molded foam article which exhibits flame resistance, said method comprising the step of reacting:
(A) an isocyanate comprising toluene diisocyanate; and
(B) an isocyanate-reactive component comprising a first polyol;
wherein (A) and (B) are reacted in the presence of a blowing agent and a pholene oxide component, said phospholene oxide component present in an amount of from 0.05 to 6.0 parts by weight based on 100 parts by weight of total polyol present in said isocyanate-reactive component, and optionally a halogen free flame retardant in an amount of less than 13 parts by weight based on 100 parts by weight of total polyol present in said isocyanate-reactive component,
wherein the phospholene oxide component is a solution comprising 3-methyl-1-phenyl-2-phospholene oxide and triethyl phosphate in a weight ratio of from 1:3 to 1:1,
wherein (A) and (B) are reacted at an isocyanate index of from 90 to 120, and the flexible polyurethane molded foam article produced by the method meeting at least one of the following two requirements for flame resistance:
(1) an average burn resistance of less than 4 inches per minute when measured according to 49 C.F.R. § 571.302, Standard No. 302; and
(2) before and after aging for 24 hours at 220° F. (104° C.) when measured according to State of California Technical Bulletin 117, Section A, Part I,
an average char length of less than or equal to 6 inches, and
a maximum char length of less than or equal to 8 inches, and
an average afterflame of less than or equal to 5 seconds, and
a maximum afterflame of less than or equal to 10 seconds, and
an average afterglow of less than or equal to 15 seconds.

2. A method as set forth in claim 1 wherein the phospholene oxide component is present in said isocyanate-reactive component, and wherein said isocyanate and/or said isocyanate-reactive component comprises the halogen free flame retardant in an amount of less than 10 parts by weight, based on 100 parts by weight of total polyol present in said isocyanate-reactive component.

3. A method as set forth in claim 1, wherein said isocyanate-reactive component further comprises a graft polyol including co-polymerized styrene and acrylonitrile.

4. A method as set forth in claim 3 wherein the first polyol comprises a polyether polyol which is primary hydroxyl terminated and has a hydroxyl number of from 20 to 100 mg KOH/g.

5. A method as set forth in claim 1 wherein the first polyol comprises a polyether triol having a hydroxyl number of from 20 to 100 mg KOH/g.

6. A method as set forth in claim 1 wherein said isocyanate and said isocyanate-reactive component are substantially free of flame retardant additives other than the phospholene oxide component.

7. A flexible polyurethane molded foam article exhibiting flame resistance comprising the reaction product of:
(A) an isocyanate comprising toluene diisocyanate; and
(B) an isocyanate-reactive component comprising a first polyol;
wherein (A) and (B) are reacted in the presence of a blowing agent and a phospholene oxide component, said phospholene oxide component present in an amount of from 0.05 to 6.0 parts by weight based on 100 parts by weight of total polyol present in said isocyanate-reactive component, and optionally a halogen free flame retardant in an amount of less than 13 parts by weight based on 100 parts by weight of total polyol present in said isocyanate-reactive component,
wherein the phospholene oxide component is a solution comprising 3-methyl-1-phenyl-2-phospholene oxide and triethyl phosphate in a weight ratio of from 1:3 to 1:1,
wherein (A) and (B) are reacted at an isocyanate index of from 90 to 120, and the flexible polyurethane molded foam article meeting at least one of the following two requirements for flame resistance:
(1) an average burn resistance of less than 4 inches per minute when measured according to 49 C.F.R. § 571, 302, Standard No. 302; and
(2) before and after aging for 24 hours at 220° F. (104° C.) when measured according to State of California Technical Bulletin 117, Section A, Part I,
an average char length of less than or equal to 6 inches, and
a maximum char length of less than or equal to 8 inches, and
an average afterflame of less than or equal to 5 seconds, and
a maximum afterflame of less than or equal to 10 seconds, and
an average afterglow of less than or equal to 15 seconds.

8. A flexible polyurethane molded foam article as set forth in claim 7 having an average burn resistance of less than 1 inch per minute when measured according to 49 C.F.R. § 571.302, Standard No. 302.

9. A flexible polyurethane molded foam article as set forth in claim 7 having before and after aging for 24 hours at 220° F. (104° C.) when measured according to State of California Technical Bulletin 117, Section A, Part I:
an average char length of less than or equal to 0.5 inches;
a maximum char length of less than or equal to 1 inch;
an average afterflame of less than or equal to 3 seconds;
a maximum afterflame of less than or equal to 3.5 seconds; and
an average afterglow of less than or equal to 1 seconds.

10. A flexible polyurethane molded foam article as set forth in claim 7, wherein said phospholene oxide component is reacted to form said flexible polyurethane foam article, and said halogen free flame retardant is present in an amount of less than 10 parts by weight, based on the total weight of polyol reacted to form said flexible polyurethane foam article.

11. A flexible polyurethane molded foam article as set forth in claim 7, wherein said isocyanate-reactive component further comprises a graft polyol including co-polymerized styrene and acrylonitrile.

12. A flexible polyurethane molded foam article as set forth in claim 11, wherein said first polyol comprises a polyether polyol which is primary hydroxyl terminated and has a hydroxyl number of from 20 to 100 mg KOH/g.

13. A flexible polyurethane molded foam article as set forth in claim 12, wherein said graft polyol and said first polyol are present in a weight ratio of from 1:2 to 6:1.

14. A flexible polyurethane molded foam article as set forth in claim 7, wherein said first polyol comprises a polyether triol having a hydroxyl number of from 20 to 100 mg KOH/g.

15. A flexible polyurethane molded foam article as set forth in claim 7 having a density of from 1 to 4 pounds per cubic foot.

16. A flexible polyurethane molded foam article as set forth in claim 7 having a 90% compression set when aged at 158° F. for 22 hours of from 3 to 80% when measured in accordance with ASTM D3574.

17. A flexible polyurethane molded foam article as set forth in claim 7, wherein said isocyanate and said isocyanate-reactive component are substantially free of conventional flame retardant additives.

18. The method according to claim 1, wherein the halogen free flame retardant is utilized in the step of reacting.

19. The flexible polyurethane molded foam article as set forth in claim 7, wherein the halogen free flame retardant is utilized to form the flexible polyurethane foam article.

\* \* \* \* \*